3,268,631
PROCESS FOR PRILLING QUATERNARY AMMONIUM SALT-UREA COMPLEXES
William R. Price, Jr., Bourbonnais, and Robert E. Norris, Kankakee, Ill., assignors to General Mills, Inc., a corporation of Delaware
Filed Sept. 11, 1963, Ser. No. 308,144
2 Claims. (Cl. 264—14)

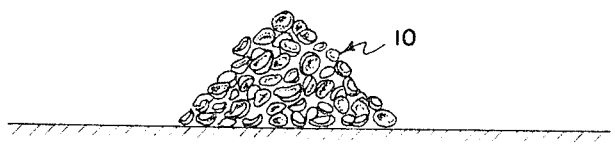
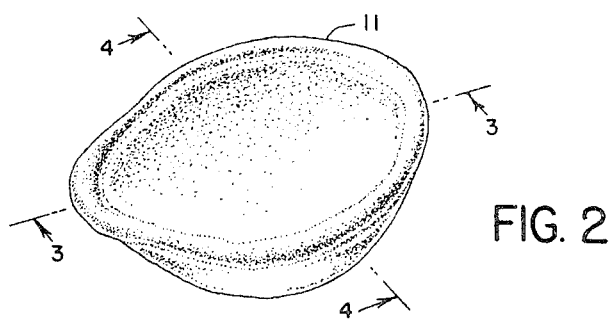
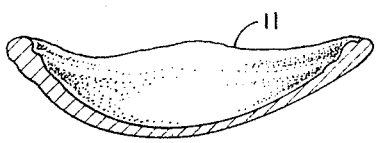 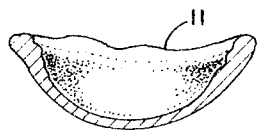
INVENTORS
WILLIAM R. PRICE JR.
ROBERT E. NORRIS United States Patent Office 3,268,631
Patented August 23, 1966

This application is a continuation-in-part application of our application Serial No. 178,553 filed March 9, 1962, now abandoned.

This invention relates to improvements in the preparation of complexes of urea and quanternary ammonium compounds. In particular, the invention relates to the preparation of such compounds during the conventional preparation of the urea and to the preparation of such compounds in an unusual form.

Urea-quaternary ammonium complexes are well known. However, in the method of preparation thereof, such methods suffer from a variety of disadvantages, in particular, disadvantages of cost and product degradation. In addition, the products provided by such methods, suffer from disadvantages of physical form for certain applications. Such prior art methods usually involve blending operations, solvent prepartion, melt preparation and a variety of rehandling steps. Blending operations constitute additional process steps requiring additional equipment with resultant time and labor costs. The preparation of solution involves cost of time, labor and solvent or solvent-recovery (particularly where the solvent is not water). The preparation of melt involves investment in equipment and cost of time, labor and heat requirements and any method requiring appreciable additional heat offers opportunity for degradation. Drying operations require equipment and are costly and any rehandling of raw materials is costly and time, labor and product loss. In addition, dry blending or blending of a solution onto a solid can result in mechanical attrition (dusting), inhomogeneity, or incomplete penetration (caking). Flaking, spray drying, drum drying, etc. often result in dusting or caking. Crushing of a solid prepared from a melt can result in dusting or caking. Crystallization from solvent is difficult to control to obtain uniform particles.

A method has now been discovered in which these disadvantages are not encountered or are substantially minimized. This method involves the forming of the urea-quaternary ammonium complex in the final stages of the conventional urea preparatio nand in the equipment already installed for urea manufacture. In addition, the present method affords a product of high quality which may be provided in a unique and unusual form. Such product is in a hard, dry, noncaking, free-flowing form with a very low degree of hygroscopicity. The lack of moisture absorption of the product leads to less expensive packaging and more convenience in handling since it doesn't cake, which caking poses a problem in prior art products.

FIGURE 1 is a side elevational view of a small portion of particles of the urea-quaternary ammonium complex in a unique form which may be provided by this invention.

FIGURE 2 is a perspective view of one of said particles of the urea-quaternary ammonium complex.

FIGURE 3 is a sectional view taken along line 3—3 of FIGURE 2.

FIGURE 4 is a sectional view taken along line 4—4 of FIGURE 2.

It is therefore an object of this invention to provide improvements in the preparation of urea-quaternary ammonium salt complexes in an essentially dry form.

It is a further object of this invention to provide these complexes in a free-flowing non-caking dry form.

It is a still further object of this invention to provide the free-flowing dry form of a urea-quaternary ammonium salt complex by methods having significant economic and processing advantages over the previously available methods.

It is still further an object of this invention to minimize degradation during the preparation of a urea-quaternary ammonium salt complex. It is also an object or this inveniton to provide such complex in a unique and novel form.

Other objects and/or advantages will be apparent from the description and discussion that follows.

Prior art methods of forming urea-quaternary ammonium complexes begin with the dry solid forms of the urea and/or the quaternary ammonium compound. These are then blended for reaction in either a dry, solid form, solution form, or melt form. Where solutions must be formed, increased solvent cost and possible loss of materials result. In dry blending, mechanical loss through attrition occurs through dusting and so forth. In the melt blending, heat must be applied to form the melt which, however, offers opportunity for degradation. At elevated temperatures, urea will degrade to form biuret, an undesirable by-product. Similarly, the long chain quaternary salt as a solution thereby taking advantage of for too long periods at these temperatures.

The present invention, however, eliminates these disadvantages of the prior art processes. To provide optimum economical benefits, it is preferable to add the quaternary ammonium salts prior to formation of the the fact that in the typical commercial process for the preparation of a long chain quaternary ammonium salt, it is during processing at one time or another in a solution form (typically, at about 50% to 85% concentration in isopropanol/water). The concentration may vary over wide ranges (less than 50% or even higher than 85% in special cases) and any number of solvent systems are applicable, such as other alcohols, other organic solvents and either water or alcohol may be absent. By using the quaternary compounds in the normal form encountered during processing, applicants' invention thus does not possess the disadvantage of having to first dissolve the quaternary ammonium salts prior to formation of the complex. Of course, any of the usual steps to provide the quaternary compounds in a dry form from the solution form are also thus avoided.

Further, in the typical commercial process for the preparation of urea, at one point or another in the process, the urea is in the form of an aqueous mixture or solution. At this point, the urea-water mixture contains water at about a 15–20% level by weight. It is at this point in the process stream in the production of urea that the quaternary ammonium compound may be added to the urea-water mixture. This introduction at this time thus avoids the usual processing methods in the prior art in which the solid urea must first be converted to a solution or molten form.

The urea-quaternary ammonium complex is then passed to a concentrator or evaporator in which any solvent or water present is substantially removed. The resulting product issuing from the concentrator is a molten urea-quaternary ammonium salt complex, which is then fed to prilling equipment to provide a dry, free-flowing form of product having a distinct and unique shape. A falling film evaporator has been found particularly suitable. In such evaporator the water content of the molten product is reduced to an absolute minimum, for example, 1% water or less. Thus the feed to the prilling equipment which provides the unique form, hard, dry, non-caking, free-flowing form with a very low degree of hygroscopicity will usually contain 1% water or less. If more water is retained in the feed to the prilling equipment, a more porous structure of product of a higher degree of hygroscopicity results.

Typical equipment utilized in the preparation of the urea-quaternary ammonium salt complex of this invention is a Stora falling film evaporator and Uhde prilling equipment. However, the invention is not to be limited to the specific types of equipment in that any suitable concentrator, evaporator, or drying equipment could be employed. Similarly, other prilling equipment or suitable equipment to provide substantially the dry forms of the quaternary-urea complex could be employed.

The molten feed of the urea-quaternary ammonium complex having not more than 1% water is directed to equipment which will provide a dry form of the complex. To provide a complex in the form of the present invention, this process step involves the forming of the urea-quaternary ammonium complex melt into small portions such as small streams, drops and the like and allowing these to cool by falling against a countercurrent flow of air in a more or less free-fall manner. In the Uhde equipment, the molten feed is fed into a basket of approximately 6 inches in diameter having holes on the outside periphery. The basket is revolving at a speed to force the molten feed through the holes on the outside periphery thus forming small streams, drops or other small portions of the molten feed. These small drops or droplets are then allowed to free-fall through a countercurrent flow of air through a column of about 100 feet in height. The diameter of the basket is not particularly critical and neither are the holes on the outside periphery of the basket. All that is required is that the molten fed be broken up into small portions so as to provide individual particles of product during the cooling occurring during the free-fall. The size of the individual particles provided is determined by the size of the holes in the basket and speed of revolution thereby, both of which may be varied. The holes on the outside periphery of the basket are generally about $1/16$ inch to $1/8$ inch in diameter and the basket is generally revolved at a speed of about 500 to 1,000 r.p.m. when using the hundred foot tower and a countercurrent of air flowing at a volumetric rate of 2,000 to 2,500 cubic feet per minute.

Whenever molten masses of material are injected in such a manner, during free-fall the molten mass tends to assume a spherical shape or form thus finally providing spherical particles. In the present invention, however, under controlled conditions, cooling and solidification of the product may be accomplished prior to formation of said spherical shape. Under such conditions, the products resulting are not small spheres but instead provide a shape resembling half of a clam shell, which shape will be further described hereinbelow.

The molten feed to the basket or other apparatus, which will separate the feed mass into small molten portions, is required to be above the melting point of the urea-quaternary ammonium complex. Such complexes generally have a melting point at about 250° F., and accordingly, the temperature must be in excess of 250° F. The usual temperatures employed are in the range of about 275–325° F. The maximum temperature at which the melt may be fed to the particle-forming apparatus is the temperature at which substantial degradation occurs. As the temperature is increased, degradation occurs to provide biuret. As this is undesirable, the temperature is selected to provide a minimum of biuret formation. The temperatures in excess of 325° F. are generally to be avoided as temperatures above this point tend to provide substantial amounts of biuret. Also higher temperatures would require the use of higher towers to provide sufficient time for the molten masses to form and set.

The temperature of the countercurrent flow of air is generally merely held at ambient temperature. In general, the temperature of the air is within the range of 40° F. to 110° F. However, temperatures above 110° F. could be employed as it is merely required that the temperature of the air be below the melting point of the molten feed which is about 250° F. However, in using higher temperature air, it may be necessary to increase the length of the column through which the particles free-fall as solidification will occur much slower with higher temperature air and a longer column must then be utilized to provide sufficient time for the particles to solidify. Temperatures below 40° F. can, of course, be utilized; however, such temperatures should not be so low as to provide solidification immediately upon ejection from the basket. With lower temperatures, the height of the tower through which the masses fall may be accordingly decreased.

Accordingly, the molten feed must be at a temperature above the melting point of the urea-quaternary ammonium complex and must be below the temperature at which substantial degradation to form biuret occurs. The temperature of the countercurrent air generally determines the height of the column to be used. The maximum temperature, of course, is limited to the melting point of the complex. The lower temperature is limited to temperatures which do not provide too hasty solidification of the product. In general, temperatures of about 40° to 110° F. will be used with a column of a height between 50 to 200 feet. In general, a column of about 100 feet is employed using a basket feeder, an air temperature of 40 to 110° F. and a molten feed temperature of between 275° to 300° F.

As previously indicated, in forming the molten feed into a solid particulate form by the method described above, a novel and unique shape of product may be provided with the urea-quaternary ammonium complex. Instead of forming a spherical shape that might be expected, this novel form of product assumes the shape resembling that of a clam shell. While this shape is somewhat difficult to define, it is perhaps best seen by reference to the drawings. In the drawings, FIGURE 1 shows a small portion, 10, of the dry, particulate form of the urea-quaternary ammonium complex. FIGURE 2 illustrates the shape or form of an individual particle, 11, of the complex. As can be seen from FIGURE 2 and sectional FIGURES 3 and 4, this shape is substantially clam-shell like. As used herein, the term "clam-shell like" is used to define this shape. Another means of identifying this shape is that it may be described as conchoidal or semi-ellipsoidal in nature having one concave and one convex side and having an irregular thickness to provide a conchiform particle. The shell-like form will generally be elongated having one longer dimension and one shorter dimension. In general, the longer dimension varies from about $1/8$ to $1/4$ inch in length, while the shorter dimension will vary from about $1/16$ to $3/16$ inch in length. Some of the particles may have both dimensions substantially equal in which case the particle forms an almost semi-spherical hollow disk-like shape. In addition, many of the particles contain striations or lines therein which cause it to even more closely resemble a clam-shell shape.

The particular particles and their shape provide several advantages over other prior art products. In the particulate form of this invention, whether spherical, conchoidal or other particulate shape, the complex is dry, hard, non-caking, and free-flowing with a very low degree of hygroscopicity. These products are particularly suitable for use as softening agents in the conventional laundry operation. Due to their low hygroscopicity, the products are stable for storage for long periods of time. In this dry particulate form, the products avoid the disadvantages of liquid handling which is the conventional form in which such softeners today appear. Further, the conchoidal shape in particular presents a large surface area which provides for ready solubility when employed as a laundry softening agent. Thus, this particular shape possesses distinct advantages over a spherical shape.

The specific ratios of quaternary ammonium compounds and urea may vary widely depending on the anticipated end use. Generally, the quaternary is added at a level of about 5% to about 20% based on the weight of urea present. More or less may be added as the end-use dictates and as is limited by the physical nature of the solid complex. At very high levels of certain quaternaries, i.e., 25%, a problem of the waxy, pasty, or soft nature of the mixtures may be limiting. In the preparation of specific end-use formulations by our method, we contemplate the addition of other ingredients than merely the quaternary ammonium compound and urea, such as dispersants, wetting agents, solubilizers, diluents, flow-promoting agents, colors or dyes, whiteners, brighteners, perfumes, other biocides, corrosion inhibitors, chelating agents, water softeners, builders, etc. The level of addition of these materials may vary widely. Their use and level of use is dictated by economics, desired result, and physical nature of the resulting mixture.

The quaternary ammonium compounds of the present invention are of a wide range of quaternary ammonium salts, wherein attached to the nitrogen atom thereof, or if more than one nitrogen atom is present, attached to at least one nitrogen atom thereof is at least one long chain alkyl group. This alkyl group may be straight chain, branched, saturated, unsaturated, with or without substituents thereon. However, generally speaking the compounds of greatest commercial interest are those derived from fatty acids, that is acids containing an aliphatic hydrocarbon group and of about 8 to about 22 carbon atoms. In general, any long chain quaternary ammonium compound forming a complex with urea is contemplated. Typical of these compounds are quaternaries with the general formula:

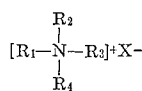

Where $R_1$ is an aliphatic hydrocarbon group of 8 to 22 carbon atoms, $R_2$ is an alkyl group of from 1 to 22 carbon atoms, $R_3$ is an alkyl group from 1 to 22 carbon atoms, and $R_4$ is selected from the group consisting of alkyl groups of 1 to 4 carbon atoms, arylalkyl groups, alkylaryl groups, and alicyclic groups; and X is a salt forming group such as halide, sulfate, nitrite, nitrate, methosulfate, ethosulfate, etc. Specific examples of compounds falling within this group are:

N-fatty trimethyl ammonium halides
N,N-difatty dimethyl ammonium methosulfates
N,N,N-trifatty methyl ammonium nitrites
N-fatty dimethyl benzyl ammonium sulfate
N,N-difatty methyl alkylbenzyl ammonium chloride
N-fatty dimethyl furfuryl ammonium chloride Also contemplated within the scope of our invention are quaternaries having the general formula:

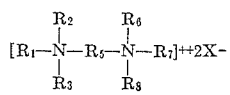

Where $R_1$, $R_2$ and $R_3$ are as described above; $R_5$ is a divalent alkylene radical of from 1 to 4 carbon atoms, $R_6$ is an alkyl group of from 1 to 4 carbon atoms, $R_7$ is an alkyl group of from 1 to 4 carbon atoms, and $R_8$ is an alkyl group of from 1 to 4 carbon atoms, and X is as described above. Typical of this class of compounds are the N-fatty N,N-dimethyl N′, N′, N′-trimethyl 1,3-propylene diammonium chlorides and the N,N-difatty N-methyl N′, N′, N′-difatty N-methyl N′, N′, N′-trimethyl 1,3-propylene diammonium chlorides. Also contemplated within the scope of our invention are the compounds of the general formula:

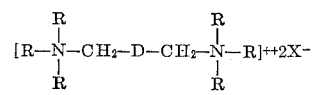

Where R is an alkyl group of from 1 to 4 carbon atoms, D is the dimeryl radical, that is the divalent radical derived from the polymerization of unsaturated fatty acids such as oleic, linoleic, linolenic acids and the like; and X is as described above. Similarly, we would contemplate as falling within the scope of our invention, other quaternary ammonium compounds containing at least one long chain alkyl radical, such as N-fatty pyridinium quaternary ammonium compounds, N-fatty oxazolinium quaternary ammonium compounds, N-fatty piperazinium quaternary ammonium compounds, etc.

A preferred specific embodiment of the present invention can be seen from the following. The quaternary compound is a simple mono-fatty dimethyl benzyl quaternary ammonium chloride, or the like for use as a biocide, for example, or of a difatty dimethyl ammonium chloride compound or the like (for use as a textile softener, for example) which is utilized in a water isopropanol solution thereof at a concentration of about 50–85% solids content. This solution of the quaternary ammonium chloride compounds is then added to the aqueous urea stream encountered in the conventional process for the manufacture of urea. This urea stream is composed on urea in a molten condition having about 83% urea therein.

After the addition of the quaternary ammonium chloride to the urea stream, the complex formed is fed to a Stora evaporator or concentrator in which the water and isopropanol is removed to provide a melt of the complex having a water content of about 1% or less. This molten complex is then fed to prilling equipment, a Uhde prilling equipment, which consists of a basket about six inches in diameter having holes on the outside periphery which is revolving at about 500 to 1,000 r.p.m. and the holes on the basket having a diameter of about $\frac{1}{16}$ to $\frac{1}{8}$ inch. The basket is at the top of a column about 100 feet in height through which a flow of air at ambient temperature is flowing countercurrent to the fall of molten material coming out of the holes on the periphery of the basket. As the small portions of the molten mass fall through the air, these are cooled and solidified to provide a product in which the particles have the shape substantially as described previously, and in which the particles which do assume a spherical shape are found in an amount generally less than about 2% of the total product.

The embodiments of the invention in which an exclusive property or privilege is claimed are defined as follows:

1. A process of preparing a conchiform, hard, dry, non-caking, free-flowing complex of urea and a quaternary ammonium compound having at least one long chain alkyl of from 8 to 22 carbon atoms comprising forming a melt of a complex of said urea and quaternary ammonium compound having a temperature of from 275 to 325° F. and a moisture content not more than 1% by weight into a plurality of particulate molten masses and subjecting said particulate molten masses to free-fall in a countercurrent flow of air at a temperature between 40 to 110° F. to solidify said particulate masses prior to formation of said particulate masses into a spherical shape thereby providing a conchiform particle.

2. A process as defined in claim 1 in which said quaternary ammonium compound is di(hydrogenated tallow) dimethyl ammonium chloride.

References Cited by the Examiner

UNITED STATES PATENTS 2,676,955   4/1954   Weitkamp _____ 260—96.5

FOREIGN PATENTS 245,105   6/1960   Australia.

HENRY R. JILES, *Acting Primary Examiner.*

JOSEPH A. NARCAVAGE, *Assistant Examiner.*